United States Patent Office 3,516,983
Patented June 23, 1970

3,516,983
TREATMENT OF XANTHOMONAS HYDROPHILIC COLLOID AND RESULTING PRODUCT
George T. Colegrove, San Diego, Calif., assignor to Kelco Company, San Diego, Calif., a corporation of Delaware
No Drawing. Filed Jan. 11, 1968, Ser. No. 697,034
Int. Cl. C07c 47/18
U.S. Cl. 260—209
15 Claims

ABSTRACT OF THE DISCLOSURE

Process for purifying a Xanthomonas hydrophilic colloid containing proteinaceous impurities in aqueous media by maintaining the pH of the media above about 8.0, preferably above about 10.0, adding an alkali metal hypochlorite to the mixture, preferably at a concentration of about 0.25 to 2.0 percent, then adjusting the pH of the media to slightly acidic, and adding a lower alcohol to precipitate the Xanthomonas hydrophilic colloid.

---

This invention relates to an improved hydrophilic colloid obtained from treatment of the colloid produced by a Xanthomonas bacteria. More particularly, the present invention pertains to a method for improving the clarity of a Xanthomonas hydrophilic colloid and also to the colloid so obtained.

Xanthomonas hydrophilic colloid is a biosynthetic polysaccharide composed of glucose, mannose, and glucuronic acid in the molar ratio 2:1:1, with approximately each ¼ unit of polymer containing one acetyl group. It disperses or dissolves in water to give solutions of greatly increased viscosity, and in that respect is similar to some other natural gums. However, the clarity of such solutions is not very great, and the general opacity of the solutions combined with an off-white to yellowish tinge makes a Xanthomonas hydrophilic colloid, as ordinarily obtained, unsuitable for many applications. Furthermore, the colloid as ordinarily obtained is unduly subject to spoilage when in aqueous solution and it is necessary to incorporate chemical preservatives such as chlorinated phenolic compounds, formaldehyde, and the like. It appears that the spoilage tendencies of the Xanthomonas hydrophilic colloid are associated with the components in the colloid, as ordinarily produced, which cause opacity and off-white coloring of its solutions.

A previous process for the clarification of a Xanthomonas hydrophilic colloid was based, at least to some degree, on the use of filtration. Due to the difficulties involved in filtering a Xanthomonas hydrophilic colloid, which is a relatively thick viscous material, the previous process required that the Xanthomonas hydrophilic colloid be diluted and also required that it be heated and cooled under controlled pH conditions prior to filtration.

The previous process is relatively time consuming and costly because of the requirement that the Xanthomonas colloid be diluted and filtered. Thus, an object of the present invention is to provide a process for purification of a Xanthomonas hydrophilic colloid which does not require dilution of a Xanthomonas hydrophilic colloid coupled with filtration as a means of obtaining a material having improved clarity and stability.

Additional objects will become apparent from a reading of the specification and claims which follow:

As a starting material, I employ a Xanthomonas hydrophilic colloid solution and preferably a crude solution thereof known as a beer. A Xanthomonas hydrophilic colloid that is particularly suitable for use in accordance with my invention is such a colloid prepared by the bacterium *Xanthomonas campestris*. The said colloid is a polymer containing mannose, glucose, and potassium glucuronate. In such a colloid, the potassium portion can be replaced by several other cations without substantial change in the property of the said material for my purpose. The said colloid, which is a high molecular weight, exocellular material, may be prepared by the bacterium *Xanthomonas campestris*, by whole culture fermentation of a medium containing 2–5 percent commercial glucose, an organic nitrogen source, dipotassium hydrogen phosphate and appropriate trace elements. The incubation time of the final medium is approximately 96 hours at 30° C. under aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing *Xanthomonas campestris* hydrophilic colloid, a loopful of organism from the agar slant is adequate for the first stage comprising 200 milliliters of the said glucose medium. In the second stage the material resulting from the first stage may be used together with 9 times its volume of a 3% glucose medium. In the final stage the material produced in the second stage may be admixed with 19 times its volume of the final medium. A good final medium may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. A Xanthomonas colloidal solution in the aforementioned stage of preparation is known as a beer. This is a preferred starting material for practicing my invention and, i.e., the beer resulting directly from the said fermentation may be used as the starting material.

In practicing my process, a fermentation beer containing a Xanthomonas hydrophilic colloid, which may be prepared in the manner described above, is treated with a selected oxidizing agent. Although the starting material is preferably a fermentation beer, my process may also be applied to solutions of a Xanthomonas hydrophilic colloid. After treatment of the fermentation beer with the selected oxidizing agent, the Xanthomonas hydrophilic colloid is readily separated from the impurities therein through precipitation of the colloid in alcohol.

Surprisingly, the specific oxidizing agent which is employed in my process is quite critical to the success of the process. The oxidizing agents which I have found suitable are the alkali metal hypochlorites, such as sodium hypochlorite, potassium hypochlorite, and lithium hypochlorite. Seemingly closely related materials, such as hydrogen peroxide, and chlorine gas do not function in my process.

The alkali metal hypochlorite may be added to the fermentation beer, as described above, or it may be formed in situ by the addition of chlorine gas with an alkali metal hydroxide, e.g., sodium hydroxide, which materials react to form the alkali metal hypochlorite, e.g., sodium hypochlorite. During the addition of the selected oxidizing agent, the pH of the reaction medium containing the Xanthomonas hydrophilic colloid fermentation beer is maintained above about 8.0 and more preferably is maintained at a pH of about 10 or above. The pH may be held at this level until the proteinaceous impurities in the colloid are oxidized, e.g., several hours after the addition of the selected oxidizing agent, after which the pH is then adjusted to slightly acid, e.g., about 5 to about 5.7, before precipitation of the Xanthomonas hydrophilic colloid through the addition of an alcohol.

To further illustrate my invention there are presented the following examples in which all parts and percentages are by weight unless otherwise indicated.

EXAMPLE I

To 500 grams of a fermentation beer containing a *Xanthomonas campestris* hydrophilic colloid, prepared in the general manner as described above, was added 100 milliliters of a liqlid bleach containing 6% by weight of sodium hypochlorite in water. After the addition of the liquid bleach, the pH of the mixture was adjusted to 11.5 through the addition of sodium hydroxide. The reaction mixture was then stirred for 2½ hours and neutralized to a pH of 5.7 through the addition of hydrochloric acid. After neutralization, the *Xanthomonas campestris* hydrophilic colloid was precipitated through the addition of 750 milliliters of isopropanol. The *Xanthomonas campestris* hydrophilic colloid had good clarity and a pH of 7.05. The pH of the product and its viscosity in aqueous solution corresponded to the pH and viscosity of an authentic sample of *Xanthomonas campestris* hydrophilic colloid thereby showing that my process did not degrade the *Xanthomonas campestris* hydrophilic colloid.

EXAMPLE II

To 500 grams of a 2% aqueous solution of the *Xanthomonas campestris* hydrophilic colloid in water (including proteinaceous impurities in the Xanthomonas hydrophilic colloid) was added 50 milliliters of liquid bleach containing sodium hypochlorite to produce a sodium hypochlorite concentration in the overall mixture of about 0.55 percent by weight. The pH of the overall mixture was then adjusted to 10 through the addition of sodium hydroxide and was held at this level for 1 hour which the pH was then adjusted to 5.5 through the addition of hydrochloric acid. The *Xanthomonas campestris* hydrophilic colloid was then precipitated through the addition of 750 milliliters of isopropanol. The resultant product was found to have very good clarity which was far superior to that of the 2% solution of Xanthomonas colloid employed as the starting material.

EXAMPLE III

To 1,000 grams of a fermentation beer containing a *Xanthomonas campestris* hydrophilic colloid and prepared in the manner generally described above, was added 8.0 grams of sodium hydroxide. After the addition of the sodium hydroxide, the mixture was stirred for 15 minutes and chlorine gas was then slowly added through means of a bubble tube until the pH of the overall mixtlre had dropped to 9.5. Additional sodium hydroxide was then added (1 gram) in order to raise the pH of the mixture to 11.1. The reaction mixture was then held for 4 hours after which the pH was adjusted to 5.3 through the addition of hydrochloric acid. The colloid was then precipitated with isopropanol, as in the previous examples, and the yield of the resulting high purity *Xanthomonas campestris* hydrophilic colloid was 23.5 grams. The material had very good clarity and its viscosity in an aqueous solution at a concentration of 1% by weight was 960 cps. at a pH of 6.6. An aqueous solution of the colloid had very slight haze and was easily polish filtered in order to remove the last traces of haze.

Polish filtration was accomplished by usual methods such as the use of diatomaceous earth. Preferably, the polish filtration of the product was performed at a temperature of about 70° to 80° C. since, at this temperature, the viscosity of the solution was somewhat lower and this aided the filtration procedure.

In practicing my process, I have found that a suitable time for the overall reaction is in the range of about 1 to about 5 hours, and preferably the reaction time employed is about 3 to 4 hours. The concentration of the alkali-metal hypochlorite in the reaction mixture can range from about 0.25 to about 2.0% by weight. Preferably, however, the concentration of the alkali-metal hypochlorite in the reaction mixture is controlled within the range of about 0.5 to about 1.0% by weight. Of the various enumerated alkali-metal hypochlorites, I prefer and find best the use of sodium hypochlorite. The reaction temperature may be varied; however, I have found that a temperature of about 20° C. to about 30° C. is quite suitable in the practice of my process.

Preferably, the Xanthomonas colloid which I purify according to my process is that produced by the bacterium *Xanthomonas campestris*. However, related species of Xanthomonas also produce hydrophilic colloids which may be utilized with almost equal success in many instances. Such other species are *Xanthomonas begoniae, Xanthomonas malvacearum, Xanthomonas carotae, Xanthomonas incanae, Xanthomonas phaseoli, Xanthomonas vesicatoria, Xanthomonas papavericola, Xanthomonas translucens, Xanthomonas vasculorum, Xanthomonas hederae,* and others. These are all included within the scope of my invention.

The final product is precipitated from the beer or other aqueous solution thereof by precipitation with alcohol. Suitable alcohols for such purpose are lower alcohols, such as methyl, ethyl or isopropyl alcohol. The alcohol should be used in an amount in excess of the water present in the beer or solution. The preferred alcohol is isopropyl alcohol and I have found a ratio of about 55 parts alcohol to 45 parts water on a weight basis to be effective. Higher amounts of alcohol will increase operation costs. In using methyl or ethyl alcohol, slightly higher amounts are required than when using isopropyl alcohol. The precipitate resulting from the aforementioned alcohol treatment is then preferably dried and milled.

As described in the foregoing specification, my invention provides a Xanthomonas hydrophilic colloid of greatly improved clarity by means of a process which does not require dilution of the colloid coupled with a filtration procedure. Having fully defined my invention in the specification, I desire to be limited only by the lawful scope of the appended claims.

I claim:

1. Process for purifying a Xanthomonas hydrophilic colloid, said process comprising contacting a Xanthomonas hydrophilic colloid containing proteinaceous impurities in an aqueous media with an alkali metal hypochlorite, maintaining the pH of said media above about 8.0 until said proteinaceous impurities are oxidized, adjusting the pH of said media to slightly acid, and precipitating said Xanthomonas hydrophilic colloid through addition of a lower alcohol to said media.

2. The process of claim 1 wherein the pH of said media is maintained above about 10.0 after addition of said alkali metal hypochlorite.

3. The process of claim 1 wherein said Xanthomonas hydrophilic colloid containing proteinaceous impurities is in the form of fermentation beer.

4. The process of claim 1 wherein said Xanthomonas hydrophilic colloid is produced by the bacterium *Xanthomonas campestris.*

5. The process of claim 1 wherein said Xanthomonas hydrophilic colloid is produced by the bacterium *Xanthomonas malvacearum.*

6. The process of claim 1 wherein the concentration of said alkali metal hypochlorite is about 0.25 to about 2.0% by weight of the reaction mixture.

7. The process of claim 2 wherein the pH of said aqueous media is adjusted to about 5.0 to 5.7 after oxidation of said preteinaceous impurities.

8. The process of claim 7 wherein the reaction mixture is maintained at a temperature of about 20° to 30° C. and the reaction time is in the range of about 1 to 5 hours.

9. Process for purifying a Xanthomonas hydrophilic colloid, said process comprising contacting a Xanthomonas hydrophilic colloid containing proteinaceous impurities in an aqueous media with an alkali metal hypochlorite at a concentration of about 0.5 to 1.0% by weight of the reaction system while maintaining the pH of said media above about 10.0 for a reaction period of about 1 to 5 hours, adjusting the pH of said media to about 5. to 5.7, and adding a lower alcohol to precipitate said colloid.

10. The process of claim 9 wherein said colloid is produced by the bacterium *Xanthomonas campestris*.

11. The process of claim 10 wherein said alkali metal hypochlorite is sodium hypochlorite.

12. The process of claim 10 wherein said lower alcohol is isopropyl alcohol.

13. The process of claim 10 wherein the reaction is carried out at a temperature of about 20° to 30° C. for about 3 to 4 hours.

14. The process of claim 9 wherein said colloid is produced by the bacterium *Xanthomonas malvacearum*.

15. The process of claim 11 wherein the sodium hypochlorite is formed in situ in the reaction mixture.

References Cited

UNITED STATES PATENTS

| | | | |
|---|---|---|---|
| 3,232,929 | 2/1966 | McNeeley et al. | 260—209 |
| 3,236,792 | 2/1966 | Curtis | 260—209 |
| 3,251,781 | 5/1966 | Jordan | 260—209 |
| 3,299,052 | 1/1967 | Curtis | 260—209 |
| 3,355,447 | 11/1967 | O'Connell | 260—209 |
| 3,376,282 | 4/1968 | Schweiger | 260—209 |
| 3,378,541 | 4/1968 | Colquhoun et al. | 260—209 |

LEWIS GOTTS, Primary Examiner

J. R. BROWN, Assistant Examiner

U.S. Cl. X.R.

195—31